(12) United States Patent
Seibt et al.

(10) Patent No.: US 8,397,318 B2
(45) Date of Patent: Mar. 19, 2013

(54) FLUSHING SYSTEM FOR A VACUUM TOILET

(75) Inventors: Christian Seibt, Buchholz (DE); Marc Scheel, Hamburg (DE); Frank Schneider, Hamburg (DE); Wilhelm Lutzer, Zarpen (DE); Matthias Mueller, Harsefeld (DE)

(73) Assignee: Airbus Operations GmbH (DE)

( * ) Notice: Subject to any disclaimer, the term of this patent is extended or adjusted under 35 U.S.C. 154(b) by 1184 days.

(21) Appl. No.: 11/732,494

(22) Filed: Apr. 3, 2007

(65) Prior Publication Data

US 2007/0245473 A1   Oct. 25, 2007

Related U.S. Application Data

(60) Provisional application No. 60/744,284, filed on Apr. 5, 2006.

(30) Foreign Application Priority Data

Apr. 5, 2006   (DE) .................. 10 2006 016 030

(51) Int. Cl.
  *E03D 11/00* (2006.01)
  *B64D 11/02* (2006.01)
(52) U.S. Cl. ................................ 4/316; 4/431
(58) Field of Classification Search .............. 4/234, 300, 4/316, 329, 330, 332, 340, 342, 431–435, 4/438–442, DIG. 9; 137/205
See application file for complete search history.

(56) References Cited

U.S. PATENT DOCUMENTS

| | | | |
|---|---|---|---|
| 1,732,192 A * | 10/1929 | Lee | 4/432 |
| 4,120,312 A * | 10/1978 | Michael | 4/431 |
| 4,928,326 A | 5/1990 | Olin et al. | |
| 4,991,623 A | 2/1991 | Ericson | |
| 5,165,457 A * | 11/1992 | Olin et al. | 4/300 |
| 5,317,763 A * | 6/1994 | Frank et al. | 4/434 |
| 6,082,979 A * | 7/2000 | Friedman | 417/566 |
| 6,243,887 B1 * | 6/2001 | Palffy et al. | 4/431 |
| 6,648,002 B2 | 11/2003 | Lappalainen et al. | |
| 7,246,386 B2 | 7/2007 | Hall | |
| 2003/0167561 A1 | 9/2003 | Nilsson | |
| 2006/0225200 A1 | 10/2006 | Wierenga | |
| 2008/0185477 A1 | 8/2008 | Seibt | |
| 2008/0201832 A1 | 8/2008 | Seibt | |
| 2009/0165197 A1 | 7/2009 | Seibt | |

FOREIGN PATENT DOCUMENTS

| | | |
|---|---|---|
| DE | 38 11 162 | 10/1988 |
| DE | 42 01 986 | 4/1993 |
| DE | 102006016030 | 10/2007 |
| DE | 102007004831 | 8/2008 |
| DE | 102007004832 | 8/2008 |

OTHER PUBLICATIONS

Commonly owned pending U.S. Appl. No. 12/317,264, filed Dec. 18, 2008 (Also cited as Publication No. US2009/0165197).

* cited by examiner

*Primary Examiner* — Gregory Huson
*Assistant Examiner* — Erin Deery
(74) *Attorney, Agent, or Firm* — Lerner, David, Littenberg, Krumholz & Mentlik, LLP

(57) ABSTRACT

The system for flushing a vacuum toilet contains a urinal basin having a drain, which is connected to a drain line, and a bypass line, into which the drain line discharges, and which is connectable via a suction valve to a vacuum system. By generating a main air current in the bypass line and a secondary air current in the drain line, a noise emission in the area of the urinal basin may be significantly reduced.

10 Claims, 2 Drawing Sheets

FLUSHING SYSTEM FOR A VACUUM TOILET

CROSS-REFERENCE TO RELATED APPLICATIONS

This application claims the benefit of the filing date of U.S. Provisional Patent Application No. 60/744,284 filed Apr. 5, 2006, the disclosure of which is hereby incorporated herein by reference.

BACKGROUND OF THE INVENTION

The present invention relates to a system for flushing of a vacuum fluid, in particular a flushing system for a vacuum toilet in an aircraft.

Known flushing devices for a vacuum toilet having a urinal require triggering a flushing procedure by actuating a trigger unit after the urinal is used. Flushing liquid is then first supplied into the urinal and subsequently a suction valve is opened, in order to conduct urine, flushing liquid, and other contaminants into the area of a wastewater tank. The transport procedure is typically performed by a pressure differential between the wastewater tank and the installation space of the vacuum toilet. During the flushing procedure, there is a significant noise emission in typical systems for flushing a vacuum toilet because of the air currents caused during the flushing procedure, which may be amplified even more by a funnel effect of the urinal basin.

SUMMARY OF THE INVENTION

There may be a need to provide a system for flushing a vacuum toilet, which reduces the noise emissions arising during the performance of a flushing procedure.

The need may be met by a system for flushing a vacuum toilet, comprising a urinal basin having a drain, which is connected to a drain line, and a bypass line, which discharges into the drain line and is connectable via a suction valve to a vacuum system. Refinements of the present invention are also provided herein.

The system according to the present invention contains a urinal basin having a drain, which is connected to a drain line, and a bypass line, into which the drain line discharges, and which is connectable to a vacuum system via a suction valve.

According to a refinement of the present invention, the bypass line is connected to the drain line via a coupling.

According to another refinement of the present invention, the pipe diameters, pipe lengths, and flow resistances of the drain line and the bypass line are dimensioned in such a way that a pressure loss in the drain line is higher than a pressure loss in the bypass line.

According to another refinement of the present invention, a flushing water supply is provided, which feeds flushing water via a flushing valve into the urinal basin during a flushing procedure.

According to another refinement of the present invention, the bypass line is connected at one end to the suction valve and at the other end to an odor trap, which is to prevent unpleasant odors from penetrating outward from the bypass line.

According to another refinement of the present invention, the end of the bypass line supplying the ambient air is provided with a noise damper, due to which only slight perceivable noise emissions are caused at the bypass line.

According to another refinement of the present invention, the system contains a control unit, which activates the flushing valve and the suction valve. The flushing valve and the suction valve may be activated by the control unit with a time delay. The flushing valve may be activated earlier than the suction valve.

According to the present invention, a main air current is guided through the bypass line, which is coupled via the suction valve to the vacuum system, during a flushing procedure.

Due to the use of a bypass line, it is possible to conduct only a small air current through the urinal basin and the required air current for the essential transport of contaminants, the urine, and the flushing liquid through the bypass line. In this way, the noise developed may be very strongly reduced due to the small air current at the drain of the urinal basin.

Furthermore, it is possible to cause slight perceivable noise emissions at the bypass line by a connection of the bypass line to a noise damper.

The propagation of a remaining noise emission originating from the noise damper may be reduced further by situating the noise damper behind a noise-damping panel and not suctioning the quantity of air necessary for flushing from the toilet pedestal, but rather from an environment separate from the installation location of the vacuum toilet.

It is possible to prevent relaying odors from the system and/or from the pipelines to the environment by an odor trap on the urinal basin drain, urinal basin overflow, and on the bypass (after the noise damper in the flow direction of a main air current when the suction valve is opened).

A defined coordination of the flushing and suction procedures may be provided by the control unit, which first opens the flushing valve and then the suction valve. To minimize a noise emission duration and to ensure a sufficient cleaning function, for example, an activation time of approximately one second is provided for the suction valve and an activation time of approximately three seconds is provided for the flushing valve.

In the following, preferred exemplary embodiments of the present invention are described with reference to the attached drawings.

BRIEF DESCRIPTION

DETAILED DESCRIPTION

Figure 1:
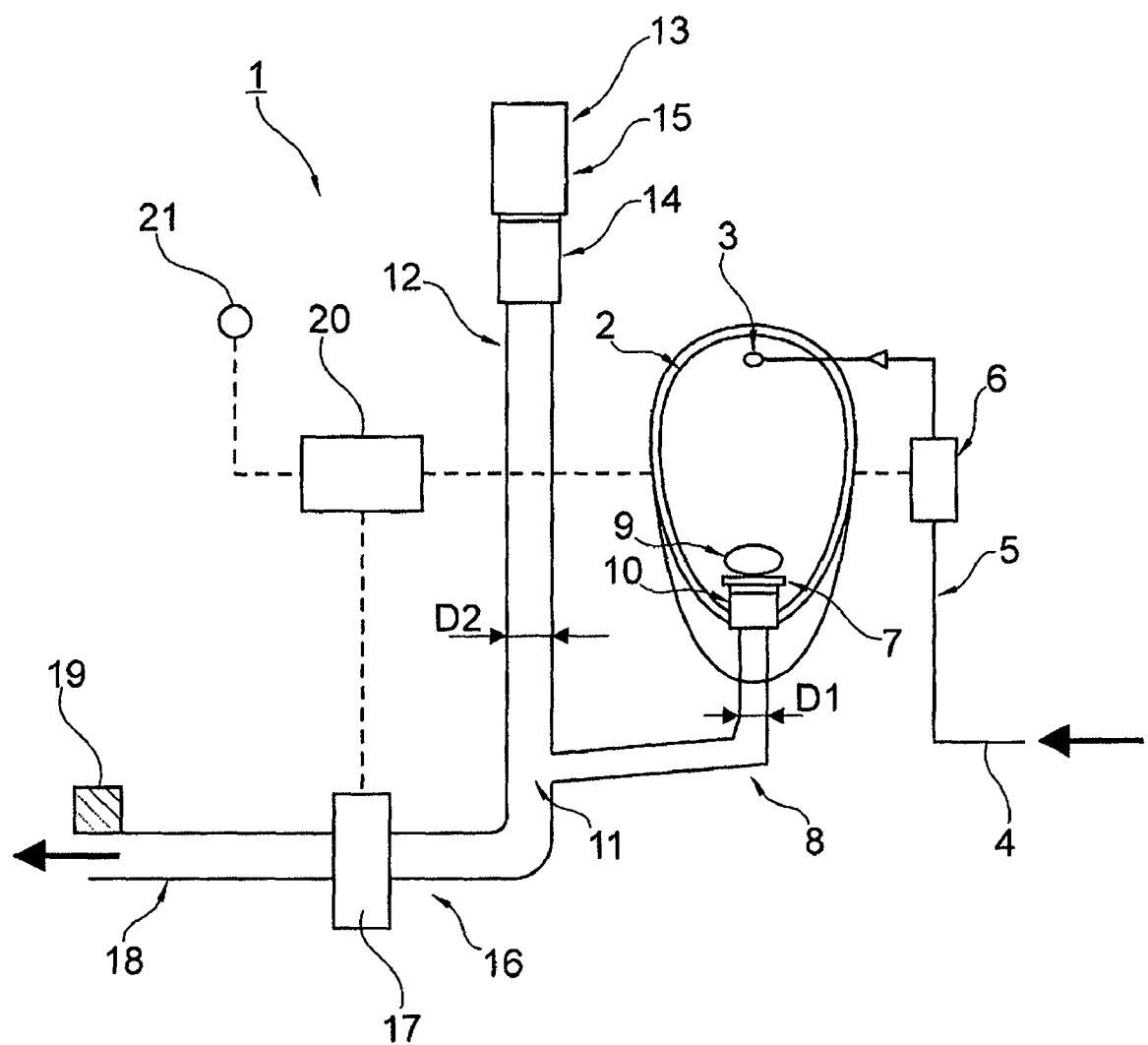
FIG. 1 shows a system for flushing a vacuum toilet according to an illustrative embodiment of the present invention.
Figure 2:
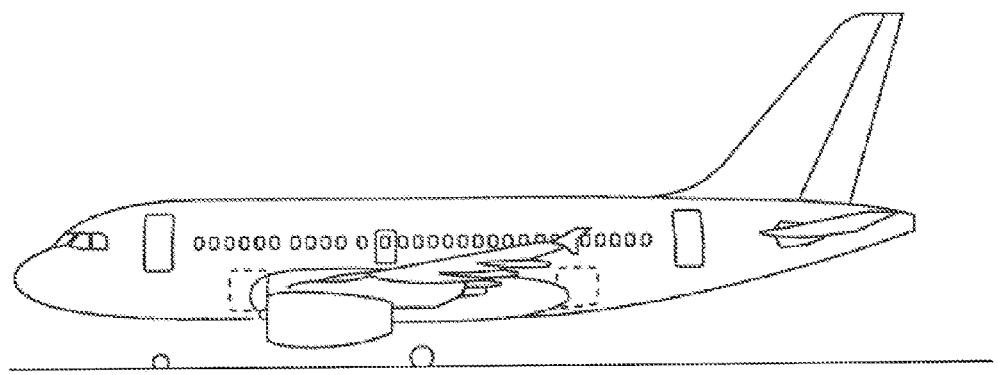
FIG. 2 shows an aircraft according to an illustrative embodiment of the present invention.

FIG. 1 shows a system for flushing a vacuum toilet. The vacuum toilet contains a urinal basin 2 having a flushing ring or flushing nozzle(s) 3. The flushing ring 3 or the flushing nozzle(s) is/are expediently situated in the area of an upper delimitation of the urinal basin 2 in the vertical direction. Flushing water is delivered via a flushing water supply line 4, a flushing line 5, and a flushing valve 6 to the flushing ring 3 or flushing nozzle(s) when the flushing valve 6 is opened. In the closed state of the flushing valve 6, no flushing water is delivered to the flushing ring 3 or flushing nozzle(s).

During a flushing procedure, the flushing valve 6 is opened and flushing water is sprayed via a flushing ring or flushing nozzle(s) 3 into the urinal basin 2.

As shown in FIG. 1, the urinal basin 2 contains a drain 7, which is connected to a drain line 8. According to the preferred exemplary embodiment, a screen 9 and an odor trap 10 are provided at the drain 7 of the urine of basin 2. Other devices may be used for separating out transport material, which may not enter the drain line 8 of the urinal basin 2, and to prevent an odor development in the toilet room.

The drain line 8 discharges via a coupling 11 into a bypass line 12. As shown in FIG. 1, the drain line 8 has a predetermined inclination, in order to transport transport material located therein and the flushing water in the direction of the bypass line 12 because of gravity. An end 13 of the bypass line 12 pointing toward the surroundings contains an odor trap 14 and an intake noise damper 15. The odor trap 14 and the intake noise damper 15 are located above the coupling 11.

The intake noise damper 15 and the odor trap 14 are situated according to the preferred exemplary embodiment in such a way that an air inlet opening of the intake noise damper 15 and the odor trap 14 lie above a maximum possible liquid level. Alternatively, another configuration may be provided, a backflow preventer then having to be provided, to prevent flushing water from exiting via the end 13 of the bypass line 12 into the surroundings of the vacuum toilet, for example.

The other end 16 of the bypass line 12 discharges into a suction valve 17 below the coupling 11. The suction valve 17 is connected to a wastewater line 18. The wastewater line 18 is connected to a vacuum system 19, which generates a vacuum and a suction current in the wastewater line 18. The suction valve 17 may be opened and closed and generates a suction current in the bypass line 12 and the drain line 8 in the opened state.

As shown in FIG. 1 by the dashed lines, the suction valve 17 and the flushing valve 6 are activated by a control unit 20. The control unit 20 is connected to a trigger unit 21, which, according to the preferred exemplary embodiment, is an operating button which may be actuated by a user of the vacuum toilet to trigger the flushing procedure after a pressure actuation. Alternatively, the flushing procedure may be triggered automatically using a corresponding sensor system. The flushing may be triggered by detection via a sensor system before usage, upon leaving, or upon closure of the urinal cover.

The pipe diameter D1 of the drain line 8 and the pipe diameter D2 of the bypass line 12 as well as the lengths of the pipelines and flow resistances of these pipelines are dimensioned in such a way that a pressure loss in the drain line 8 is greater than a pressure loss in the bypass line 12. The pipe diameter D1 of the drain line 8 must also be dimensioned large enough that the largest particles and fluids which may pass the screen 9 are still introduced into the pipe system. The dimensioning of the mesh width of the screen 9 depends on the construction of the odor trap 10 in the drain line 8.

To perform a flushing procedure after a usage of the urinal basin 2, the control unit 20 is activated via the trigger unit 21. The control unit 20 predefines activation times for the flushing valve 6 and the suction valve 17. According to the preferred exemplary embodiment, the flushing valve 6 first opens for approximately one second, by which flushing water is introduced into the urinal basin 2, by which contaminants present in the urinal basin 2 are transported via the screen 9 and the odor trap 10 into the drain line 8. Before the suction valve 17 is opened by the control unit 20, the transport material (the urine, contaminants, and the flushing water) flows, driven by gravity, into the drain line 8 and, via a gradient of the drain line 8 to be maintained, via the coupling 11 into the bypass line 12 up to the suction valve 17. Subsequently, the flushing valve 6 is closed and the suction valve 17 is preferably opened for approximately two to three seconds, by which the substances collected in the area of the urinal basin 2, the drain line 8, and in the bypass line 12 are drained because of a pressure differential generated in the vacuum system 19 into the wastewater line 18 and further into the vacuum system. The air supply to the suction valve 17 is noise-damped by the noise damper 15, so that disturbing noise emissions are suppressed here.

Although the present invention was described in the preceding with reference to a preferred embodiment, various alterations and modifications may be performed without leaving the protective scope of the present invention. The present invention is also to be usable in fields other than air travel, for example, in trains or ships, where vacuum toilets are also used and the problem of reducing the noise emissions also exists. Furthermore, other activation times may be set for the suction valve and the flushing valve as a function of the dimensioning of the vacuum toilet.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

LIST OF REFERENCE NUMERALS 1 system
2 urinal basin
3 flushing ring or flushing nozzle
4 flushing water supply
5 flushing line
6 flushing valve
7 drain
8 drain line
9 screen
10 odor trap
11 coupling
12 bypass line
13 one end of the bypass line
14 odor trap
15 intake noise damper
16 other end of the bypass line
17 suction valve
18 wastewater line
19 vacuum system
20 control unit
21 trigger unit

The invention claimed is:

1. A system for flushing a vacuum toilet, comprising:
a urinal basin having a drain, which is connected to a drain line, and
a bypass line, which is connected via a suction valve to a vacuum system,
wherein the drain line discharges into the bypass line upstream of the suction valve,
wherein the bypass line is at a first end directly connected to the suction valve and wherein the drain line has a predetermined continuous inclination from the drain to the bypass line in order to transport waste material located therein in the direction of the bypass line to the suction valve because of gravity,
wherein the bypass line is configured to provide a main air current therethrough to the vacuum system via the suction valve,
wherein the drain line is configured to provide a second air current therethrough to the vacuum system via the suction valve, and wherein the second air current is smaller than the main air current, thereby reducing the noise developed at the drain due to the second airflow caused by the vacuum system.

2. The system of claim 1, wherein the bypass line is connected via a coupling to the drain line.

3. The system of claim 1, further comprising a flushing water supply, which feeds flushing water via a flushing valve into the urinal basin during a flushing procedure.

4. The system of claim 1, wherein the bypass line is connected at a second end to an odor trap.

5. The system of claim 4, wherein the second end of the bypass line has a noise damper.

6. The system of claim 3, further comprising a control unit, which activates the flushing valve and the suction valve.

7. The system of claim 6, wherein the flushing valve and the suction valve are activated by the control unit with a time delay.

8. The system of claim 7, wherein the flushing valve is activated earlier than the suction valve.

9. An aircraft comprising:
a vacuum toilet; and
a system for flushing the vacuum toilet comprising:
a urinal basin having a drain, which is connected to a drain line, and
a bypass line, which is connected via a suction valve to a vacuum system,
wherein the drain line discharges into the bypass line upstream of the suction valve,
wherein the bypass line is at a first end directly connected to the suction valve and wherein the drain line has a predetermined continuous inclination from the drain to the bypass line in order to transport waste material located therein in the direction of the bypass line to the suction valve because of gravity,
wherein the bypass line is configured to provide a main air current therethrough to the vacuum system via the suction valve,
wherein the drain line is configured to provide a second air current therethrough to the vacuum system via the suction valve, and
wherein the second air current is smaller than the main air current, thereby reducing the noise developed at the drain due to the second airflow caused by the vacuum system.

10. The system of claim 1, wherein the pipe diameters, the pipe lengths, and the flow resistances of the drain line and the bypass line are configured such that the main airflow is greater than the second air current.

* * * * *